(12) United States Patent
Chang et al.

(10) Patent No.: US 8,397,783 B2
(45) Date of Patent: Mar. 19, 2013

(54) PRESS METHOD AND PRESS TOOL

(75) Inventors: Yu-Liang Chang, Banciao (TW); Ching-Feng Hsieh, Taipei (TW)

(73) Assignee: Askey Computer Corp., Taipei (TW)

( * ) Notice: Subject to any disclaimer, the term of this patent is extended or adjusted under 35 U.S.C. 154(b) by 495 days.

(21) Appl. No.: 12/629,360

(22) Filed: Dec. 2, 2009

(65) Prior Publication Data

US 2011/0100234 A1 May 5, 2011

(30) Foreign Application Priority Data

Oct. 30, 2009 (TW) ............................. 98136860 A

(51) Int. Cl.
*B32B 37/00* (2006.01)
(52) U.S. Cl. .......................... 156/538; 156/580; 156/581
(58) Field of Classification Search .................. 156/538, 156/556, 580, 581, 583.1
See application file for complete search history.

(56) References Cited

U.S. PATENT DOCUMENTS

| | | | | |
|---|---|---|---|---|
| 6,096,166 A | * | 8/2000 | Liou | 156/494 |
| 6,623,577 B2 | * | 9/2003 | Ogawa et al. | 156/581 |
| 7,290,580 B2 | * | 11/2007 | Naitoh et al. | 156/581 |

FOREIGN PATENT DOCUMENTS

| | | |
|---|---|---|
| TW | M268862 | 6/2005 |
| TW | M354517 | 4/2009 |

* cited by examiner

*Primary Examiner* — James Sells
(74) *Attorney, Agent, or Firm* — Tracy M. Heims; Apex Juris, pllc

(57) ABSTRACT

In a press method, a housing is placed on a carrying table, and a panel is placed on a movable platform, and then a first driving unit is used for driving the movable platform to extended from an opening of a housing into the housing, such that the panel is fixed to a position corresponding to the window without touching an internal surface of the housing, and finally a press machine is used for driving the housing and the movable platform to engage with each other, such that the panel is combined with the interior of the housing for sealing the window. Therefore, the panel can be combined into a cramped space of the housing to overcome the defective issue of the prior art. In addition, a press tool adopting the press method is provided.

14 Claims, 11 Drawing Sheets

PRESS METHOD AND PRESS TOOL

CROSS-REFERENCE TO RELATED APPLICATIONS

This non-provisional application claims priority under 35 U.S.C. §119(a) on Patent Application No(s). 098136860 filed in Taiwan, R.O.C. on 30 Oct. 2009, the entire contents of which are hereby incorporated by reference.

FIELD OF THE INVENTION

The present invention relates to a press technology, in particular to a press method and a press tool capable of extending a panel into a housing for combining the panel with the housing.

BACKGROUND OF THE INVENTION

Traditionally, a sheet component is generally attached onto an internal side of a window at a hollow surface of a housing in different ways, including the structures as disclosed in R.O.C. Pat. Nos. M354517 and M268862.

R.O.C. Pat. No. M354517 discloses a touch panel laminating machine comprising a parallel laminating mechanism, a feed mechanism and bi-directional roll-press mechanism installed on the machine, wherein the parallel laminating mechanism includes an upper base for adjusting parallelism, and the parallel laminating mechanism adopts a sideway turn or a central balanced turn, and the feed mechanism is capable of correcting X-axis and Y-axis displacements and Z-axis rotation, and designed together with two opposite roll-press rollers installed on the bi-directional roll-press mechanism for saving the roll-press operation time.

R.O.C. Pat. No. M268862 discloses a touch panel assembly laminating machine for attaching and pressing a touch panel to achieve assembling the panel.

However, the aforementioned conventional machines are applicable in an open operating space (such as a housing having a large area of hollow portion, or a housing formed by engaging two half housings). Since the interior of the housing is open to the outside, therefore there is no particular limitation on the operating space for attaching the sheet component onto the housing during a manufacturing process, and manual or simple automated equipments can be used for a direct attachment to simplify the manufacturing process.

As different specific requirements and specific features of some electronic products become stricter, related industrial standards (or specifications) are introduced and updated to satisfy a higher specification and feature (such as waterproof, dust-proof, shock-proof, and high-temperature stability features, etc) and differentiate from general consumer electronic products. Now, the structure of electronic products is also revised accordingly to meet the requirements of the related industrial standards (or specifications). For example, the conventional housing formed by a plurality of half housings is changed to the structure of an integrally formed housing to provide and enhance and improve the waterproof, dust-proof, shock-proof and EMI resistance features of the overall electronic product effectively. Since the structure of the integrally formed housing can provide an external open area much smaller than the conventional open (combinational) housing, therefore each prior art disclosed above cannot be used for manufacturing the integrally formed housing, and present electronic products are primarily manufactured with a light, thin, short and compact design, whose internal containing space is relatively small, and increases the level of difficulty of the related manual operation. More specifically, the integrally formed housing generally reserves a single-sided covered structure, such that when the internal circuit board and related components are installed, the installation is done through the opening reserved on a single side of the housing. For example, if a panel is installed in a thin housing, the installation is unstable because the panel is held by hand and extended into the limited space in the housing manually, and the adhesive pre-coated on the edge of the panel may touch the interior of the housing and be attached onto a surface of the panel, so that the panel may be stained to result in a defective and seriously affect the product yield rate and performance of production line. Furthermore, the precision of placing, position and fixing the panel will affect the final precision of attaching the panel, which will also affect product yield rate and performance of production line.

Therefore, it is an important subject for related manufacturers to install components into a cramped space stably and effectively in order to improve the product yield rate and performance of production line.

SUMMARY OF THE INVENTION

Therefore, it is a primary objective of the present invention to overcome the shortcomings of the prior art by providing a press method and a press tool for combining a panel into a cramped space of a housing easily.

Another objective of the present invention is to provide a press method and a press tool for enhancing the stability of a panel combined into a cramped space of a housing to improve the product yield rate and performance of production line.

To achieve the foregoing objectives and effects, the present invention provides a press method for combining a housing and a panel, wherein the housing comprises a window and an opening, and the press method comprises the steps of: placing a housing on a carrying table; placing a panel on a movable platform; using a first driving unit to drive the movable platform to extend from the opening into the housing, such that the panel is fixed to a position corresponding to the window without touching an internal surface of the housing; and using a press machine to drive the housing and the movable platform to engage with each other, such that the panel is combined with an interior of the housing for sealing the window.

In the aforementioned procedure, a support means is provided for supporting the movable platform to assure the parallelism between the movable platform and the housing, before the step of using the press machine to drive the housing and the movable platform to be engaged with each other.

To achieve the foregoing objectives and effects, the present invention further provides a press tool for combining a housing and a panel, wherein the housing comprises a window and an opening, and the press tool comprises: a base; a carrying table, installed on the base, for placing the housing; a movable platform, installed on the base through a first driving unit, for placing the panel, and driven by the first driving unit, such that the movable platform can drive the panel to extend from the opening into the housing, and the panel is fixed to a position corresponding to the window; and a second driving unit, installed on the base, for engaging the housing and the movable platform, such that the panel is combined with the interior of the housing for sealing the window.

To make it easier for the examiner to understand the objects, characteristics and effects of this invention, we use a preferred embodiment together with the attached drawings for the detailed description of the invention.

DESCRIPTION OF THE PREFERRED EMBODIMENTS

Detailed structure, application principle, features and advantages of the present invention will become apparent in the following detailed description of the preferred embodiments with reference to the accompanying drawings.

Figure 1:
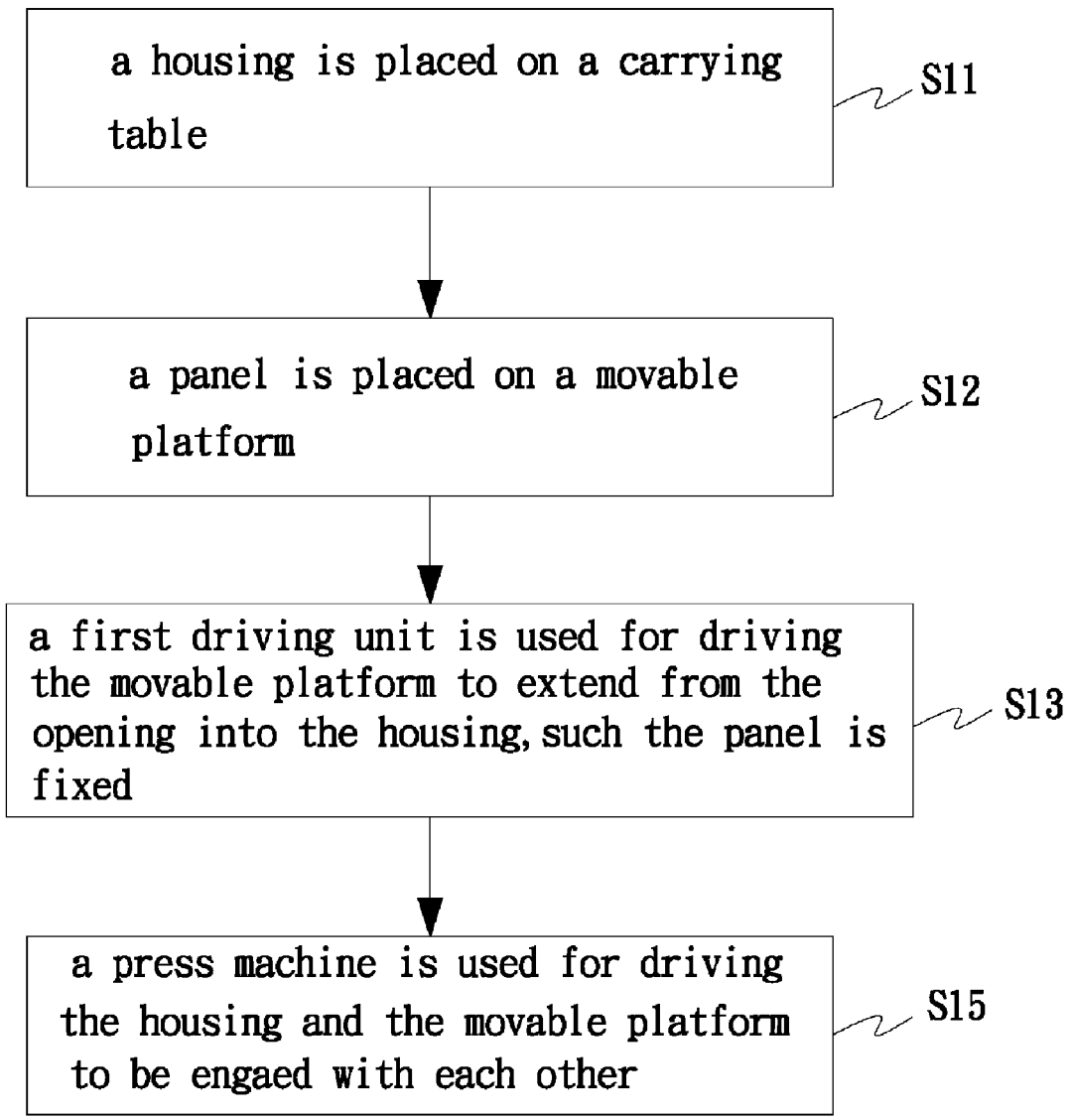
FIG. 1 is a flow chart of a press method in accordance with a first preferred embodiment of the present invention.

With reference to FIG. 1 for a flow chart of a press method for combining a housing having a window and an opening with a panel in accordance with a first preferred embodiment of the present invention, the method comprises the following steps S11 to S15.

In Step S11, a housing is placed on a carrying table. In Step S12, a panel is placed on a movable platform. In Step S13, a first driving unit is used for driving the movable platform to extend from the opening into the housing, such that the panel is fixed to a position corresponding to the window without touching an internal surface of the housing. In Step S15, a press machine is used for driving the housing and the movable platform to be engaged with each other, such that the panel is combined with the interior of the housing for sealing the window. Each of the foregoing steps is described in details together with each press tool in accordance with a preferred embodiment as follows.

Figure 2:
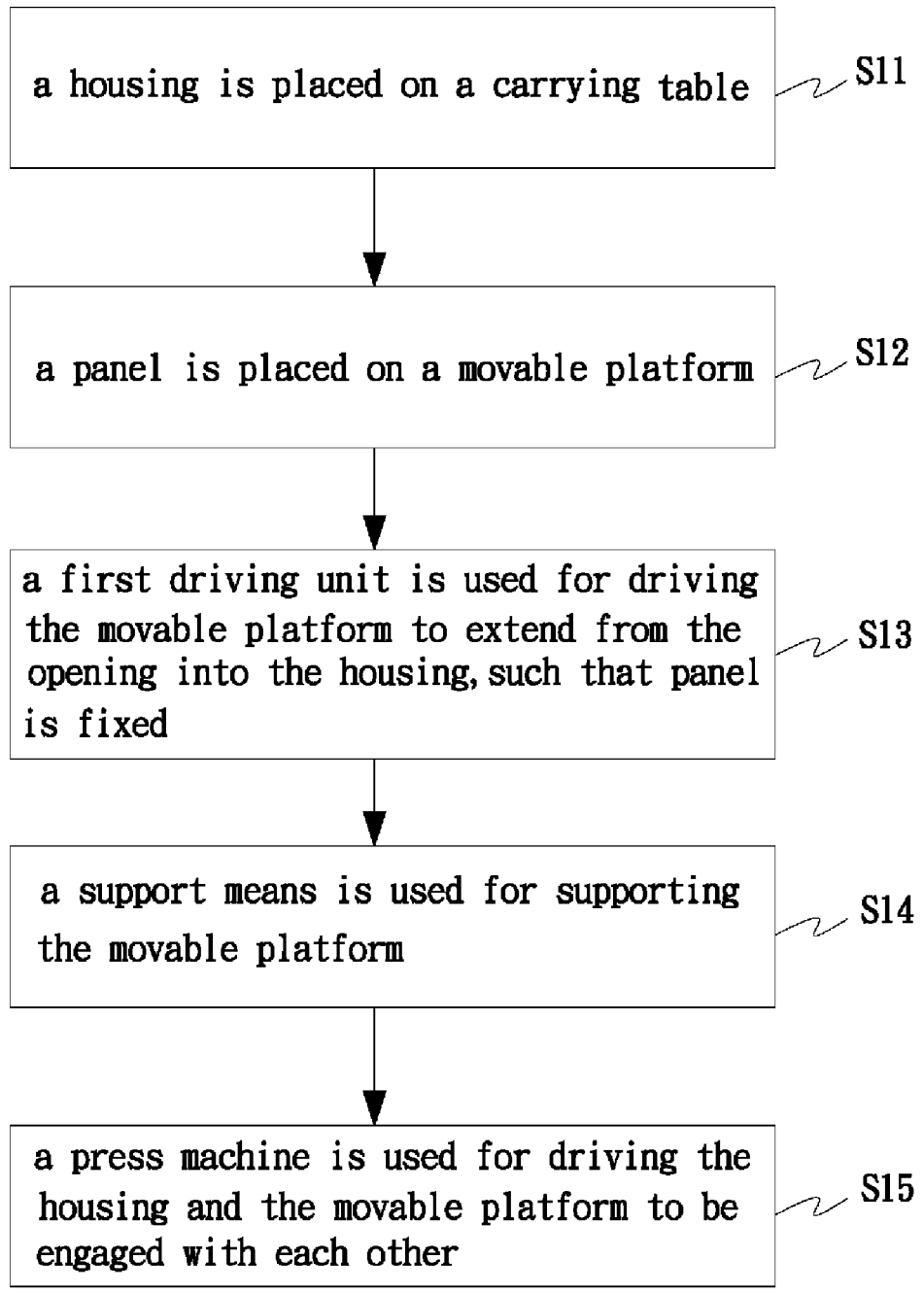
FIG. 2 is a flow chart of a press method in accordance with a second preferred embodiment of the present invention.

To assure the parallelism between the movable platform and the housing, the press method of the invention further comprises a step of supporting the movable platform. With reference to FIG. 2 for a press method in accordance with a second preferred embodiment of the present invention, this press method is substantially the same as the previous press method, except a Step 14 is added before the Step S15. In Step S14, a support means is used for supporting the movable platform to enhance the structural strength of the first driving unit effectively, such that the movable platform can bear the pressure produced by the press machine pushing the housing, and maintain the parallelism with the housing. Different implementations can be adopted in practical applications. For example, a third driving unit is installed under the carrying table, for driving a movable block to support the bottom of the movable platform, or a bump is protruded from the carrying table for supporting the bottom of the movable platform, and etc. These arrangements also achieve the same expected effects. Each step is described in details together with each press tool in according to a preferred embodiment as follows.

Figure 3:
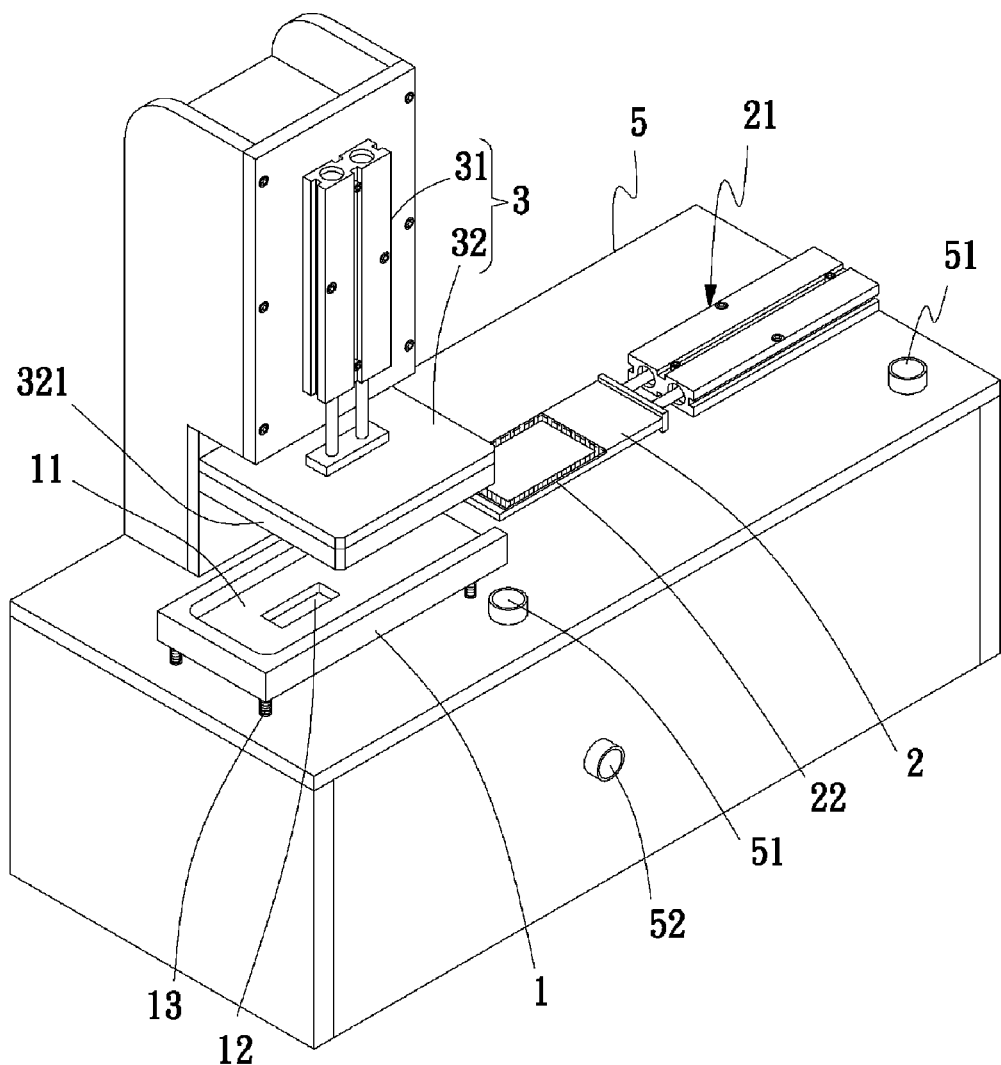
FIG. 3 is a perspective view of a press tool in accordance with a first preferred embodiment of the present invention.

With reference to FIG. 3 for a press tool in accordance with first preferred embodiment of the present invention press tool, the press tool comprises: a carrying table 1, a movable platform 2 and a press machine 3, wherein the carrying table 1 is installed on a base 5, and a groove 11 is formed on a side of the top of the carrying table 1, manufactured in the same shape of a surface of a housing 6, for maintaining a better contact with the surface of the housing 6, a breach is formed on a side of the groove 11 and interconnected with the outside, and a through hole 12 is formed at the bottom side of the groove 11, and a plurality of elastic members 13 installed between the bottom side of the carrying table 1 and the base 5.

The movable platform 2 is installed on the base 5 through a first driving unit 21, such that the first driving unit 21 can drive the movable platform 2 to slide back and forth along a predetermined path in a direction towards the breach of the groove 11. A positioning portion 22 is defined on the movable platform 2 and provided for positioning a groove of a panel 7. In this preferred embodiment, the first driving unit 21 of the press machine 3 is installed at a position corresponding to the top of the carrying table 1 by a second driving unit 31, for driving a sheet press member 32 to slide back and forth above the groove 11, a soft pad 321 such as foam or any other foaming bodies is installed at the bottom of the press member 32, for protecting a surface of the housing 6 to prevent the surface from being scratched or damaged. In this preferred embodiment, the first driving unit 21 and the second driving unit 31 are air cylinders. The present invention is not limited to such arrangements only, but persons ordinarily skilled in the art can understand that hydraulic cylinders or equivalent mechanisms can be used instead, For safety consideration, two safety switches 51 can be installed on the base 5, wherein both safety switches 51 must be pressed simultaneously before each device can be turned on, in order to assure the safety of the operation. In addition, a timer unit 52 is installed on the base 5 to calculate the time of operating the press machine 3.

Figure 4:
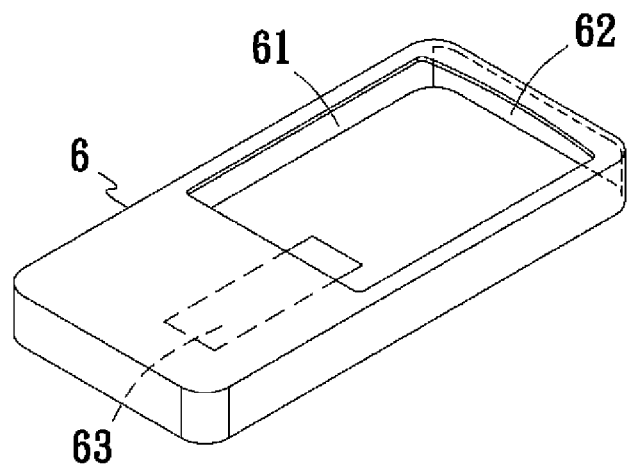
FIG. 4 is a perspective view of a housing applicable for the present invention.
Figure 5:
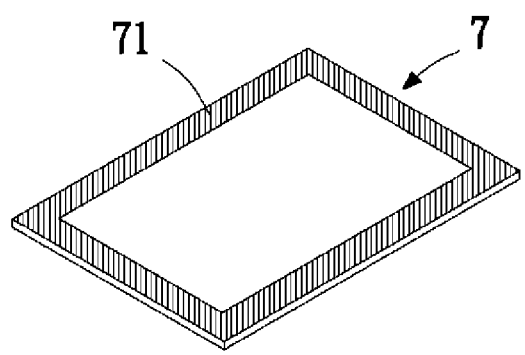
FIG. 5 is a perspective view of a panel applicable for the present invention.

In FIG. 4, the present invention is primarily used for combining a panel in a cramped space of the housing, wherein the housing 6 of this preferred embodiment is an integrally formed structure having an opening 62 formed on at least one side of the housing 6, and a window 61 and a penetrating hole 63 formed on upper and lower surfaces of the housing 6 respectively. In FIG. 5, the panel 7 is in the same shape of the window 61 and has an area slightly larger than the window 61, and an adhesive portion 71 such as an adhesive or a double-sided adhesive tape with release paper is set on the periphery of the panel 7 in advance.

Figure 6:
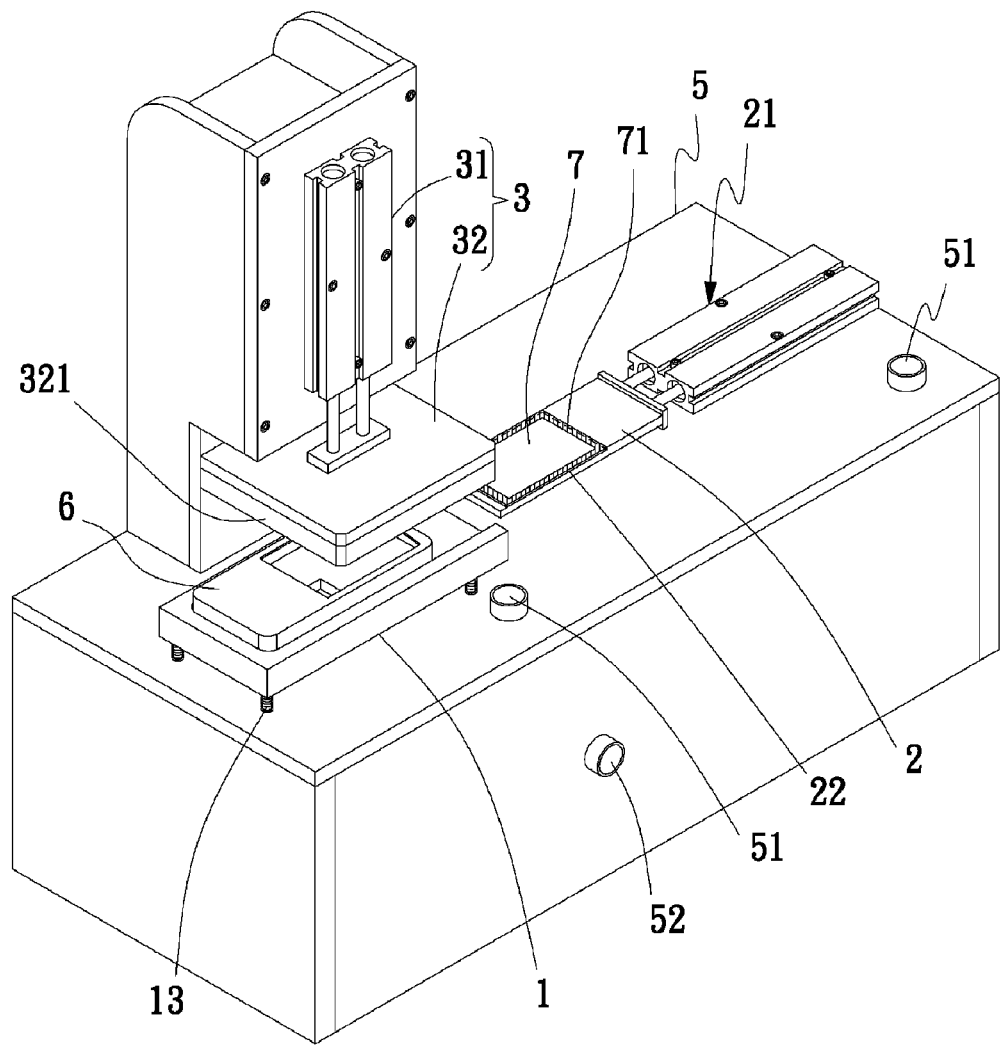
FIG. 6 is a first perspective view showing the operation of a press tool in accordance with a first preferred embodiment of the present invention.
Figure 7:
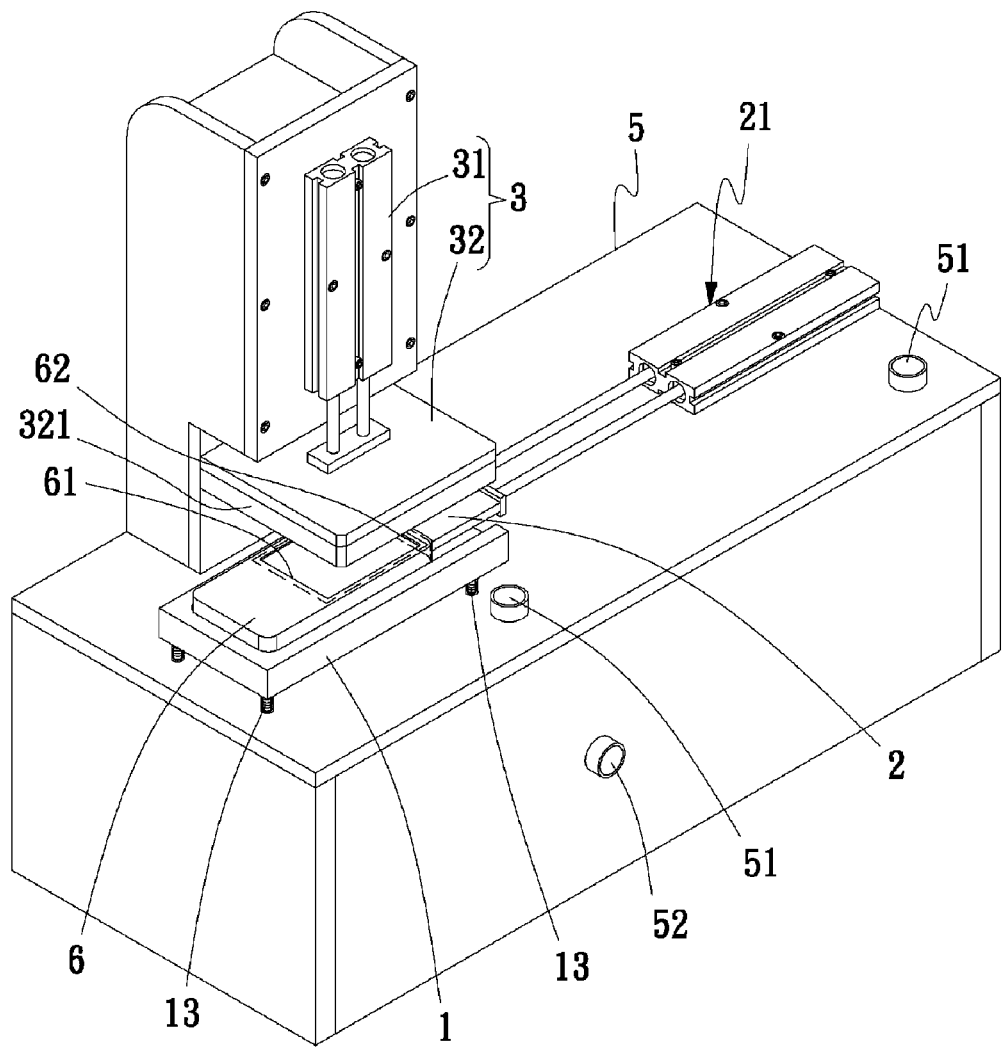
FIG. 7 is a second perspective view showing the operation of a press tool in accordance with a first preferred embodiment of the present invention.
Figure 8:
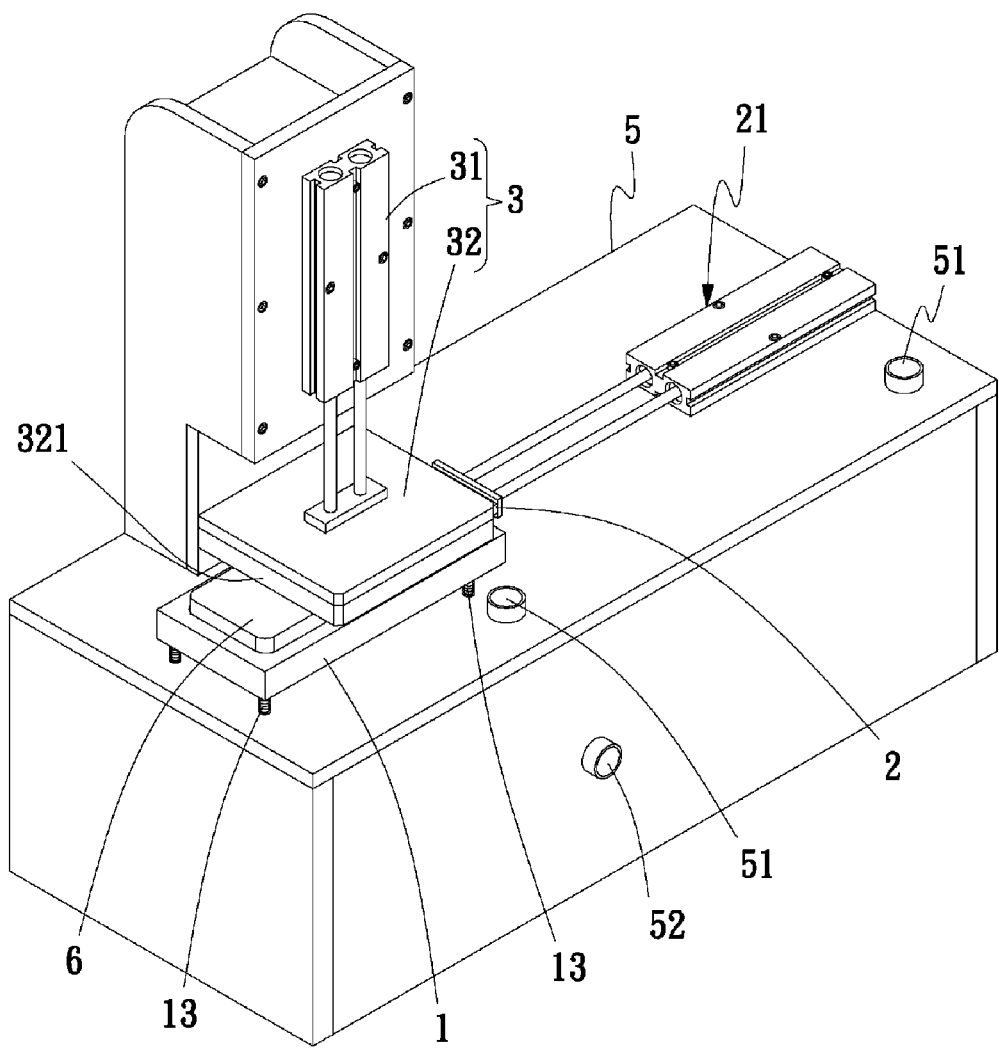
FIG. 8 is a third perspective view showing the operation of a press tool in accordance with a first preferred embodiment of the present invention.

With reference to FIGS. 6 to 8, and the flow chart of a press method as shown in FIG. 1, a press tool in accordance with a first preferred embodiment of the present invention is used. In Step S11, a housing is placed on a carrying table, wherein the housing 6 is positioned on the groove 11 of the carrying table 1. In Step S12, a panel is placed on a movable platform, wherein the panel 7 is installed on a positioning portion 22 of the movable platform 2. In Step S13, a first driving unit is used for driving the movable platform to extend from an opening into the housing, such that the panel can be fixed at a position corresponding to the window without touching an internal surface of the housing, and an operator can press two safety switches 51 simultaneously to turn on the first driving unit 21 to link the movable platform 2 to extend the panel 7 to the inside from the opening 62 of the housing 6, and fix the panel 7 at a position corresponding to the window 61 without touching an internal surface of the housing 6. In Step S15, a press machine is used for driving the housing and the movable platform to engage with each other, so that the panel is combined with the interior of the housing for sealing the window, and the second driving unit 31 of the press machine 3 drives the press member 32 to press the housing 6, and each elastic member 13 is compressed to maintain a resilience of the carrying table 1, so that the housing 6 is moved towards the movable platform 2, and the adhesive portion 71 of the panel 7 is attached onto an internal periphery of the window 61, and the timer unit 52 is provided for calculating the time, so that the panel 7 can be combined with the housing 6 completely to seal the window 61, and then the second driving unit 31 drives the press member 32 to rise and release the pressing on the housing 6, and the carrying table 1 also rises to its original position synchronously by the elasticity of each elastic member 13, and then the first driving unit 21 is retreated to link the movable platform 2 to resume its initial position.

In this preferred embodiment, a set condition includes a sufficient structural strength of the first driving unit 21, so that the movable platform 2 is sufficient to bear the pressure of the press machine 3 pushing the housing 6, and maintain the parallelism with the housing 6.

Figure 9:
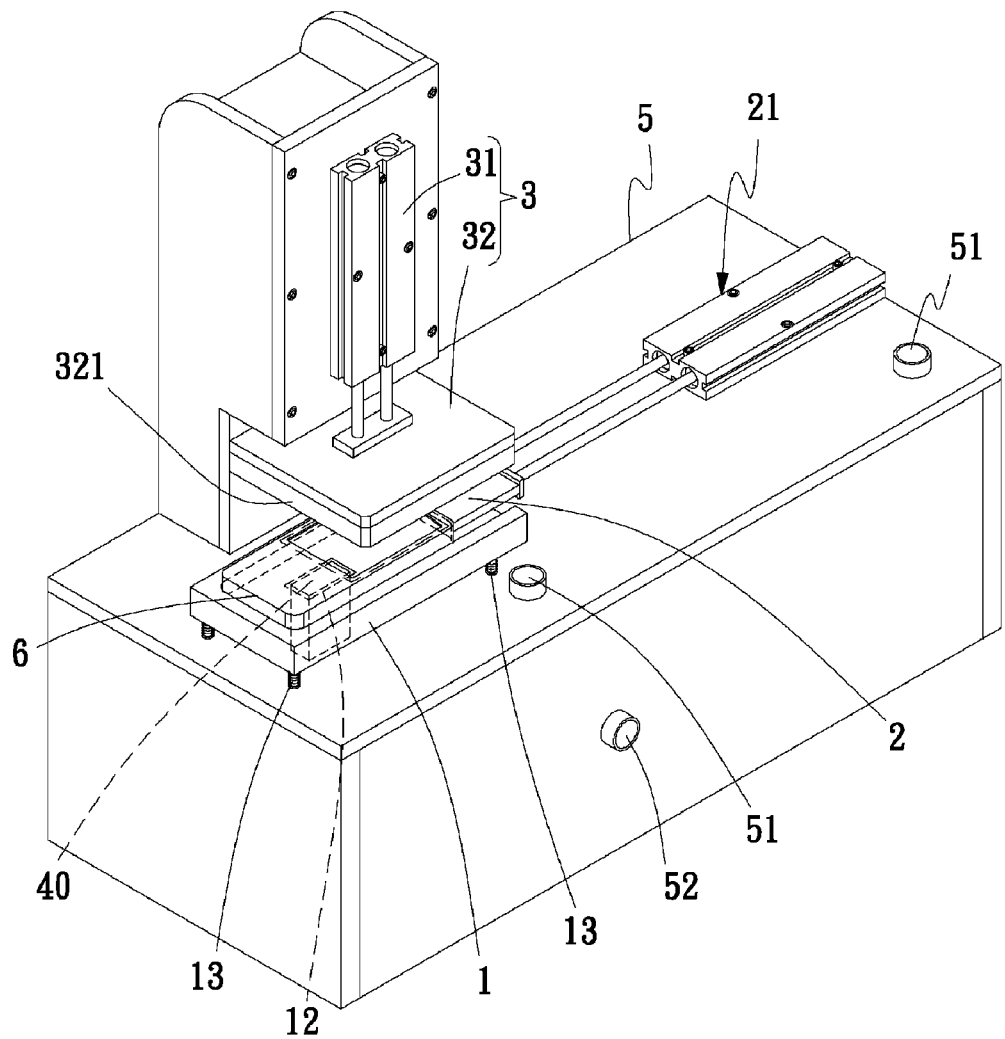
FIG. 9 is a perspective view of a press tool in accordance with a second embodiment of the present invention.
Figure 10:
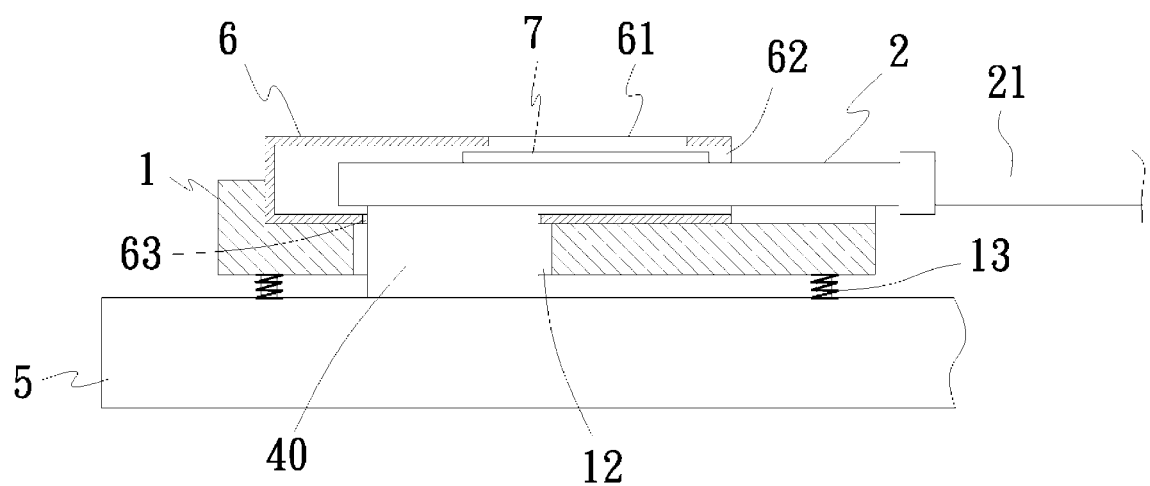
FIG. 10 is a perspective view showing the operation of a press tool in accordance with a second preferred embodiment of the present invention.

With reference to FIGS. 9 and 10 for a press tool in accordance with a second preferred embodiment of the present invention together with a flow chart for a second press method as shown in FIG. 2, the press tool has substantially the same structure of the press tool of the first preferred embodiment and comprises a carrying table 1, a movable platform 2 and a press machine 3, but the press tool of this preferred embodiment further comprises a support mechanism 40 installed on the base 5 and a bump formed at a position corresponding to the penetrating hole 12 of the carrying table 1. In this preferred embodiment, a set condition includes the first driving unit 21 having insufficient structural strength and being incapable of bearing the pressure produced by the press machine 3 pushing the housing 6. Therefore, a step S14 is carried out first before the Step S15 takes places. In Step S14, a support means is used for supporting the movable platform to enhance the structural strength of the first driving unit, such that the movable platform can bear the pressure produced by the press machine pushing the housing and maintain the parallelism with the housing, and when the movable platform 2 is extended and fixed into the housing 6, the support mechanism 40 (which is the bump) is used for abutting the bottom of the movable platform 2 to constitute a support, so as to enhance the strength of the movable platform 2, and maintain the parallelism between the movable platform 2 and the carrying table 1 for the quality assurance of the manufacture when the housing 6 is pressed by the press machine 3 to link the carrying table 1 to descend.

Figure 11:
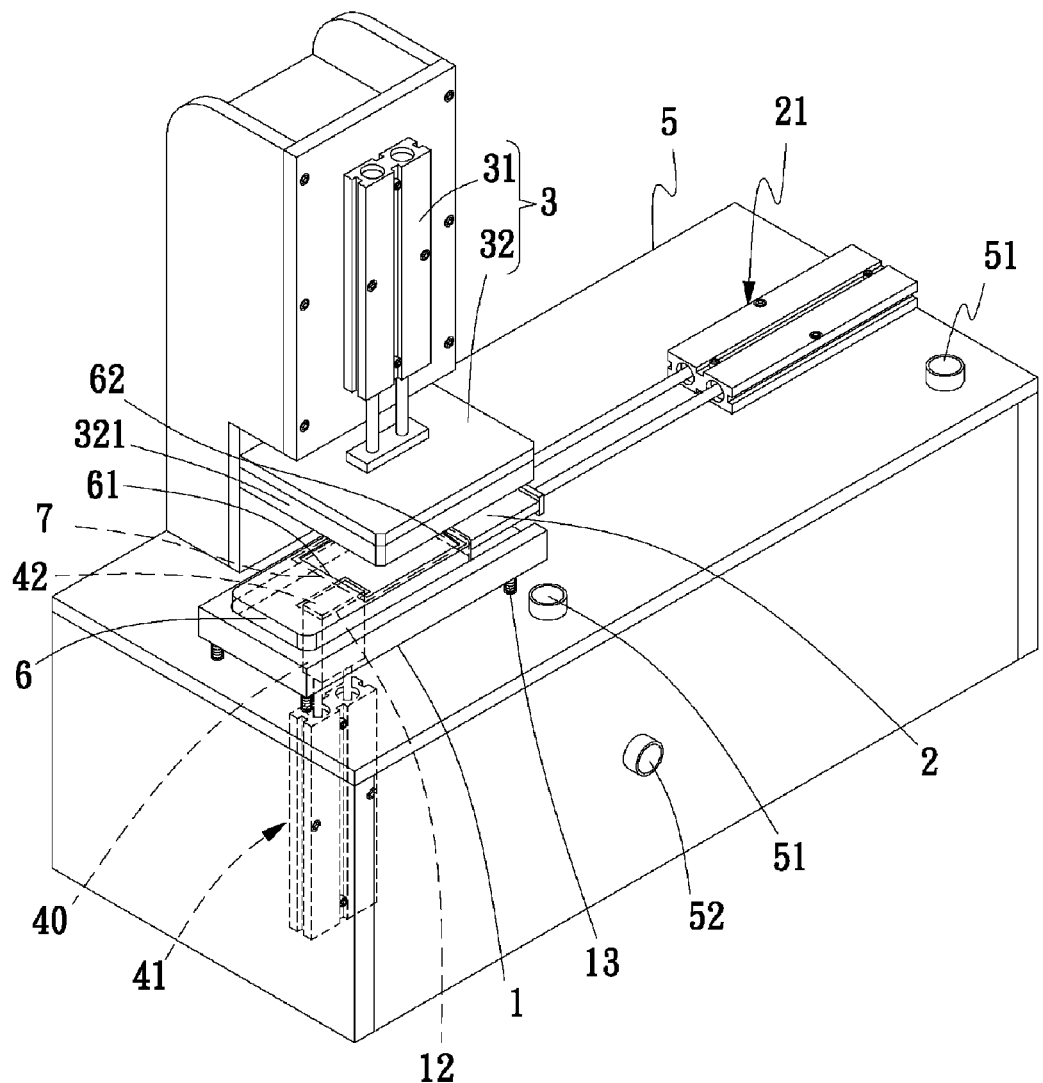
FIG. 11 is a perspective view of a press tool in accordance with a third embodiment of the present invention.
Figure 12:
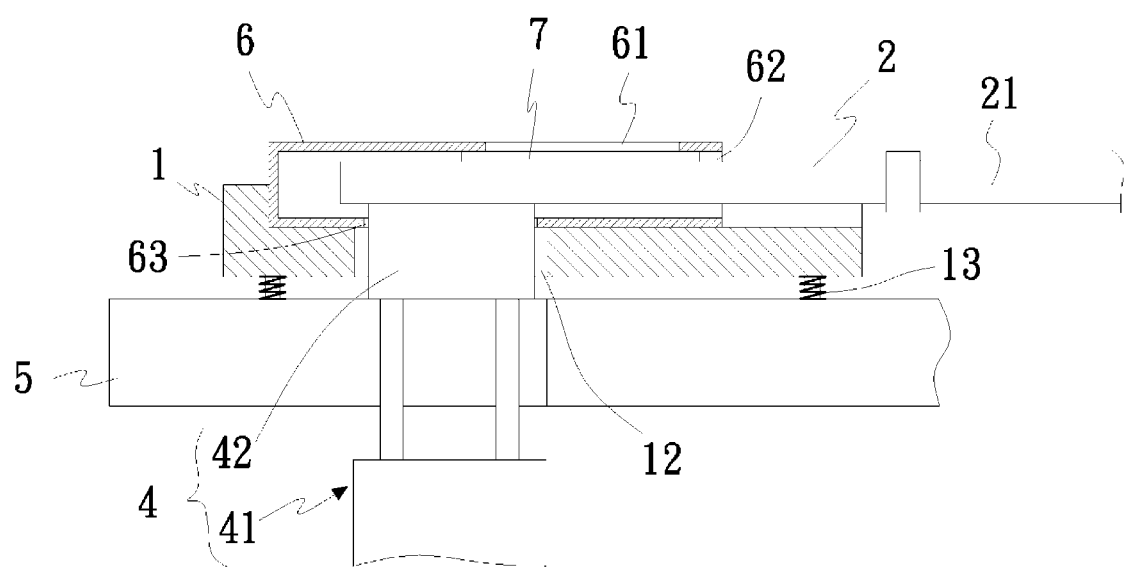
FIG. 12 is a perspective view showing the operation of a press tool in accordance with a third preferred embodiment of the present invention.

With reference to FIGS. 11 and 12 for a press tool in accordance with a third preferred embodiment of the present invention, together with a flow chart of the second press method as shown in FIG. 2, the press tool also comprises a carrying table 1, a movable platform 2 and a press machine 3, but the press tool of this embodiment further comprises a support mechanism 4 composed of a third driving unit 41 and a movable block 42, and the third driving unit 41 is an air cylinder or a hydraulic cylinder, wherein the third driving unit 41 is installed on the base 5 and at a position corresponding to the through hole 12 of the carrying table 1, and the third driving unit 41 is linked to a movable block 42 to pass upward through the through hole 12, for supporting the bottom of the movable platform 2, so as to achieve the same effect of the press tool of the second preferred embodiment.

In summation of the description above, the present invention provides a press method and a press tool using the method to achieve the effects of simplifying the manufacturing process, expediting the assembling procedure, and enhancing the product yield rate and performance of production line, and complies with patent application requirements, and thus the invention is duly filed for patent application.

While the invention has been described by means of specific embodiments, numerous modifications and variations could be made thereto by those skilled in the art without departing from the scope and spirit of the invention set forth in the claims.

What is claimed is:

1. A press tool, for combining a housing and panel, and the housing comprising a window and an opening, and the press tool comprising:
   a base;
   a carrying table, installed on the base, for placing the housing;
   a movable platform, placed on the base by a first driving unit, and provided for placing the panel, and aligning the panel to a position corresponding to the window by driving the first driving unit to extend from the opening into the housing;
   a press machine, installed at the base, for driving the housing and the movable platform to be engaged with each other, such that the panel is combined with the interior of the housing for sealing the window;
   wherein the carrying table includes a groove for placing the housing and a through hole formed in the groove, and the housing includes a penetrating hole disposed thereon and corresponding to the through hole;
   wherein the groove is in the same shape of the housing; and
   wherein the base includes a bump protruded from the through hole of the carrying table for supporting the movable platform.

2. The press tool of claim 1, wherein the base includes a third driving unit installed at a position corresponding to the through hole of the carrying table, and linked to a movable block for passing through the through hole to support the movable platform.

3. The press tool of claim 1, wherein the press machine comprises a second driving unit and a press member, the second driving unit is provided for driving the press member to push the housing to engage with the movable platform.

4. The press tool of claim 1, further comprising a plurality of elastic members installed between the carrying table and the base for driving the base to ascend and descend elastically together with the press machine.

5. The press tool of claim 1, wherein the panel includes an adhesive portion disposed at the periphery of a surface of the panel for attaching the panel into the housing.

6. The press tool of claim 1, wherein the movable platform includes a positioning portion for placing the housing.

7. The press tool of claim 6, wherein the positioning portion is a groove corresponding to the panel.

8. The press tool of claim 1, further comprising a timer unit, for calculating the time required for pressing the housing and the panel together.

9. A press tool, for combining a housing and panel, and the housing comprising a window and an opening, and the press tool comprising:
   a base;
   a carrying table, installed on the base, for placing the housing;

a movable platform, placed on the base by a first driving unit, and provided for placing the panel, and aligning the panel to a position corresponding to the window by driving the first driving unit to extend from the opening into the housing;

a press machine, installed at the base, for driving the housing and the movable platform to be engaged with each other, such that the panel is combined with the interior of the housing for sealing the window;

wherein the carrying table includes a groove for placing the housing and a through hole formed in the groove, and the housing includes a penetrating hole disposed thereon and corresponding to the through hole;

wherein the groove is in the same shape of the housing; and wherein the base includes a third driving unit installed at a position corresponding to the through hole of the carrying table, and linked to a movable block for passing through the through hole to support the movable platform.

10. The press tool of claim 9, wherein the press machine comprises a second driving unit and a press member, the second driving unit is provided for driving the press member to push the housing to engage with the movable platform.

11. The press tool of claim 9, further comprising a plurality of elastic members installed between the carrying table and the base for driving the base to ascend and descend elastically together with the press machine.

12. The press tool of claim 9, wherein the panel includes an adhesive portion disposed at the periphery of a surface of the panel for attaching the panel into the housing.

13. The press tool of claim 9, wherein the movable platform includes a positioning portion for placing the housing.

14. The press tool of claim 9, further comprising a timer unit, for calculating the time required for pressing the housing and the panel together.

* * * * *